United States Patent
Boeing et al.

(10) Patent No.: US 10,935,123 B2
(45) Date of Patent: Mar. 2, 2021

(54) ANGLE GEARED MOTOR

(71) Applicant: SIEMENS AKTIENGESELLSCHAFT, Munich (DE)

(72) Inventors: Georg Boeing, Rottenburg (DE); Jens Bihr, Lauterstein-Nenningen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 76 days.

(21) Appl. No.: 16/469,510

(22) PCT Filed: Dec. 21, 2017

(86) PCT No.: PCT/EP2017/084018
§ 371 (c)(1),
(2) Date: Jun. 13, 2019

(87) PCT Pub. No.: WO2018/115240
PCT Pub. Date: Jun. 28, 2018

(65) Prior Publication Data
US 2020/0116234 A1   Apr. 16, 2020

(30) Foreign Application Priority Data
Dec. 22, 2016   (DE) .................. 10 2016 226 046

(51) Int. Cl.
*F16H 1/14*   (2006.01)
*F16H 1/20*   (2006.01)
(Continued)

(52) U.S. Cl.
CPC ........... *F16H 57/031* (2013.01); *F16H 1/145* (2013.01); *F16H 57/023* (2013.01);
(Continued)

(58) Field of Classification Search
CPC .................. H02K 7/116; H02K 7/1163; F16H 2057/02034; F16H 57/031; F16H 57/033; F16H 57/025
See application file for complete search history.

(56) References Cited

U.S. PATENT DOCUMENTS 2,910,882 A * 11/1959 Wellauer .............. H02K 7/1163
74/412 R
5,622,077 A *  4/1997 Blanchet ................. B60S 1/166
15/250.3
(Continued)

FOREIGN PATENT DOCUMENTS

DE       4213203 C1    9/1993
DE       10312941 A1   12/2004
(Continued)

OTHER PUBLICATIONS

"PCT International Search Report and Written Opinion of International Searching Authority dated Nov. 4, 2018 corresponding to PCT International Application No. PCT/EP2017/084018 filed Dec. 21, 2017".
(Continued)

*Primary Examiner* — Jake Cook
(74) *Attorney, Agent, or Firm* — Henry M. Feiereisen LLC (57) ABSTRACT

The invention relates to an angle geared motor and to a method for setting a defined play between a pinion (17) and a gear. The angle geared motor has a gearbox housing, in which a gear is rotatably mounted, a gearbox-side motor end shield (4), through which a motor shaft (16) having a pinion (17) fastened thereto extends, an interface between the gearbox housing (11) and the gearbox-side motor end shield (4), and a pin (15), which is fastened in the motor end shield
(Continued)

(4) and which serves as a pivot point for the rotation of the gearbox housing relative to the motor end shield (4).

4 Claims, 8 Drawing Sheets

(51) Int. Cl.
  *F16H 57/031* (2012.01)
  *H02K 7/116* (2006.01)
  *F16H 57/023* (2012.01)
  *F16H 57/038* (2012.01)
  *F16H 57/02* (2012.01)

(52) U.S. Cl.
  CPC ......... *F16H 57/038* (2013.01); *H02K 7/1163* (2013.01); *F16H 2057/02034* (2013.01); *F16H 2057/02069* (2013.01); *F16H 2057/02073* (2013.01)

(56) References Cited

U.S. PATENT DOCUMENTS

| 6,234,037 | B1* | 5/2001 | Zimmer | F16H 1/12 |
| | | | | 74/416 |
| 2006/0194666 | A1* | 8/2006 | Zimmermann | F16H 1/125 |
| | | | | 475/149 |
| 2007/0272471 | A1* | 11/2007 | Kuroumaru | B62D 5/0412 |
| | | | | 180/444 |

FOREIGN PATENT DOCUMENTS

| EP | 1045168 A2 | 10/2000 |
| WO | WO 9906743 A1 | 2/1999 |
| WO | WO 2004077644 A2 | 9/2004 |

OTHER PUBLICATIONS

"PCT International Search Report and Written Opinion of International Searching Authority dated Mar. 29, 2018 corresponding to PCT International Application No. PCT/EP2017/084019 filed Dec. 21, 2017".

"PCT International Search Report and Written Opinion of International Searching Authority dated Mar. 29, 2018 corresponding to PCT International Application No. PCT/EP2017/084020 filed Dec. 21, 2017".

* cited by examiner

ANGLE GEARED MOTOR

CROSS-REFERENCES TO RELATED APPLICATIONS

This application is the U.S. National Stage of International Application No. PCT/EP2017/084018, filed Dec. 21, 2017, which designated the United States and has been published as International Publication No. WO 2018/115240 and which claims the priority of German Patent Application, Serial No. 10 2016 226 046.4, filed Dec. 22, 2016, pursuant to 35 U.S.C. 119(a)-(d).

BACKGROUND OF THE INVENTION

In principle, the term angle gear comprises all gears which allow the torque to be deflected by an angle, in particular of 90 degrees, such as bevel gears and worm gears. In this case, a distinction is made between angle gears without an axial offset and an angle gear with an axial offset. In the case of angle gears without an axial offset, the axles of the drive and driven shafts, which are at an angle to one another, intersect at an intersection point. In angle gears with an axial offset, the axles of the drive and driven shafts, which are at an angle to one another, do not have a common point of intersection, and instead they merely cross one another. Bevel gears with an axial offset are also known as hypoid gears.

With angle gears with an axial offset, for example worm and hypoid gears, the play has to be precisely set between a pinion arranged on a drive shaft and a toothed wheel arranged on a driven shaft, for example a crown gear; the tolerances are in the range of tenths of a millimeter. In the case of a worm gear, reference is made to a "contact pattern setting"; in the case of a bevel gear, reference is made to a "play setting". In the case of angle gears with an axial offset, the axial offset between the motor pinion and the toothed wheel, which is also referred to as the axial distance, is decisive for the efficiency and the possible transmission range:

With increasing axial distance (extreme case worm gear), the efficiency η (high sliding proportion in addition to rolling) decreases, but the achievable transmission range [i_min; i_max] increases (i_max to 100!).

With decreasing axial offset (extreme case bevel gear with axial offset=0), the efficiency (decreasing sliding proportion in addition to rolling) increases, but the achievable transmission range [i_min; i_max] decreases (in the case of the bevel gear, i_min approximately 1.5 and i_max approximately 6).

Worm gears are the usual solution for angle gears, but can have the disadvantage that, due to a high sliding proportion, their efficiency is relatively low. Bevel gears without axial offset have the disadvantage that the achievable transmission range is limited. Although any desired transmission ratio could also be achieved with the "bevel gears without axial offset" gear type, namely by using a plurality of gear stages, this design would be significantly more expensive than a single-stage hypoid gear.

With hypoid gears, as in the case of bevel gears without axial offset, precise setting of the play between the toothed wheel and the pinion is decisive for the efficiency, the load-bearing capacity, the noise development and the service life of the gear. The required accuracy of the respective position of pinion and toothed wheel is at $<\pm^1/_{10}$ mm.

Angular geared motors with axial offset are used inter alis in conveying technology, for example for driving a roller conveyor for transporting piece goods such as packages, suitcases, pallets or crates.

DE10200905344A1 (SEW-Eurodrive) Aug. 5, 2010 describes an angle geared motor with what is known as helicon toothing of the pinion 1. In this case, the position of the toothed wheel 6 is set in the axial direction by inserting shim rings 518, 521 between the rolling bearing 11, 25 and the securing ring 12, 88 of the rolling bearing; as a result, the axial position of the toothed wheel can be precisely set in the range of $<\pm^1/_{10}$ mm. Subsequent setting of the position of the motor pinion in the axial direction is not necessary since the cylindrical shape of the pinion (helicon) and the planar crown gear permit a tolerance of $\pm^5/_{10}$ mm.

The object of the present invention is to disclose an improved angle geared motor.

SUMMARY OF THE INVENTION

This object is inventively achieved by an angle geared motor, in particular a hypoid geared motor, having a gear housing, in which a toothed wheel is rotatably mounted, a gear-side motor end shield, through which a motor shaft having a pinion fastened thereto protrudes, an interlace between the gear housing and the gear-side motor end shield, and a pin, which is fastened in the motor end shield and which serves as a pivot point for the rotation of the gear housing relative to the motor end shield. This object is also inventively achieved by a method for setting a defined play between a pinion and a toothed wheel, in particular a crown gear, an angle geared motor as claimed in claim 1, having the following steps: rotating the gear housing until the pinion rests without play on the toothed wheel, whereby a zero position is defined, and rotating the gear housing from the zero position about a predefined angle, about the pin acting as a pivot point, wherein the angular rotation corresponds to the defined play.

The play of the tooth system is therefore set by means of a stop method, preferably when the motor is mounted on the gear-side motor end shield. The assembly time for a geared motor can thereby be greatly shortened. Complex setting of the play between the pinion and the toothed wheel by the insertion of shim rings in the region of the bearings is therefore unnecessary.

The interface between the gear housing and the gear-side motor end shield allows a rotation of the gear housing relative to the gear-side motor end shield. In this case, the gear-side motor end shield can rest directly against the gear housing, but it is also possible for a further component, which does not hinder the relative rotation, for example an oil seal, to be arranged between the gear-side motor end shield and the gear housing.

Angle geared motors are known which have a one-piece housing, comprising a cube-shaped housing section, in other words the actual gear housing, and a cylindrical housing section, in other words the motor shield. Since the cylindrical housing section defines the position of an electric motor, the one-piece construction specifies the position of the cylindrical housing section relative to the cube-shaped housing section and therefore the radial position of a pinion arranged on a motor shaft rotatably mounted in the electric motor in relation to a toothed wheel rotatably mounted in the cube-shaped housing section. A change in the play between the pinion and a toothed wheel rotatably mounted in the cube-shaped housing section can therefore be achieved only in that the toothed wheel is axially displaced, for example by inserting shim rings, which requires a great deal of effort. In addition, the gear and the motor cannot be separately mounted in two parallel assembly ones and then flanged to one another, and instead the motor has to be constructed around the motor shaft projecting out of the gear, in other words there is a limitation to a serial assembly line.

Angle geared motors are also known, which have a two-part housing, comprising a cube-shaped housing part forming the actual gear housing and a cylindrical housing part having a gear-side motor shield; for example, DE102012010789A1 (SEW-Eurodrive) Dec. 5, 2013 describes such an angle gear with two housing parts. However, these known two-part angle gears do not have any possibility for rotating the two housing parts relative to one another.

The invention proposes, in contrast, a two-part housing in which the two housing parts can be rotated relative to one another the actual gear housing and the gear-side motor shield are separated by an interface and can be rotated relative to one another about a pin acting as a pivot point. Therefore, the gear with the gear housing and the motor with the motor shield can be individually mounted in two parallel assembly lines and then finally flanged to one another; faster mounting is therefore possible. The invention has the further advantage that precise setting of a defined play between the pinion and the toothed wheel of the angle gear is simpler than previously possible.

The rotatability of the gear housing relative to the gear-side motor shield is possible in that the fastening means allow a rotational movement within a particular angular range in order to fix the gear housing relative to the gear-side motor shield, for example, continuous drilled holes, through which fastening bolts for fixing the gear housing are guided on the gear-side motor shield, can be designed as elongated holes. Once the desired position of the gear housing relative to the gear-side motor shield is achieved, the fastening bolts are tightened, so a non-rotatable position of the two housing parts relative to one other is achieved.

Advantageous embodiments and developments of the invention are specified in the dependent claims. The inventive method can also be further developed according to the dependent device claims, and vice versa.

According to a preferred embodiment of the method, the gear housing is rotated by a predetermined angle, in that the gear housing is rotated up to a corresponding specified marking on an outer side of the gear-side motor end shield. The specified marking, visible on the motor end shield when the gear housing rests against the motor end shield, indicates the relative position between motor end shield and the gear housing at which the angular rotation achieves the desired, defined play. In this way, the position of the gear housing relative to the gear-side motor shield can be set in a defined, repeatable manner.

BRIEF DESCRIPTION OF THE DRAWING

The invention will be explained below with reference to a plurality of exemplary embodiments with the aid of the accompanying drawings. In the drawings, in each case schematically and not to scale.

DETAILED DESCRIPTION OF PREFERRED EMBODIMENTS

Figure 1:
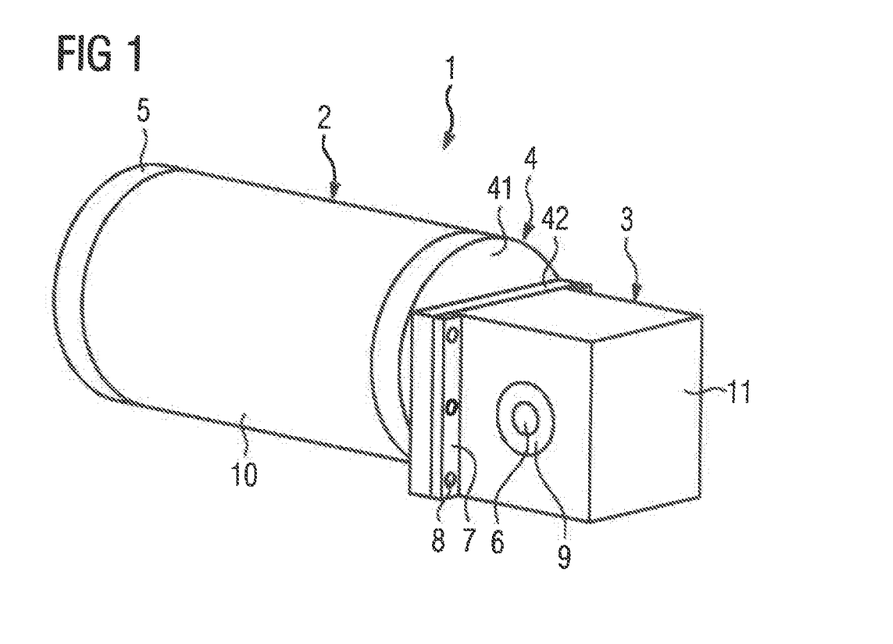
FIG. 1 shows an oblique view of a hypoid geared motor.

FIG. 1 shows an oblique view of a hypoid geared motor 1, which has an electric motor 2 and a hypoid gear 3.

The electric motor 2 has a cylindrical stator housing 10 and two motor end shields, which are mounted on the two end faces of the stator housing 10, which is also referred to as an A-side (output side) and a B-side (fan side). In this case, the A-side motor end shield 4 is located on the output side of the electric motor 2, in other words on the side facing the gear 3, and the B-side motor end shield 5 on the fan side of the electric motor 2, in other words on the side facing away from the gear 3. The A-side motor end shield 4 is therefore also referred to as a gear-side motor end shield.

The integrally formed A-side motor end shield 4 has a motor-side section 41 and a gear-side section 42. The motor-side section, which serves as a cover of the gear-side end face of the stator housing 10, has a circular circumference corresponding to the cylindrical shape of the stator housing 10. The gear-side section 42, which serves as a gear mounting plate or gear flange, has an angular circumference, corresponding to a cuboid shape of the gear housing 11.

The hypoid gear 3 has a cuboidal gear housing 11 in which a driven shaft 6 carrying a toothed wheel is mounted, and which is sealed with respect to the gear housing 11 with the aid of a shaft sealing ring 9. On two opposite sides, the gear housing 11 has in each case a flange 7 with through-holes. The two flanges 7 rest against the gear-side section 42 of the A-side motor end shield 4 and are fastened there by means of connecting bolts 8. In this case, the gear housing 11 is open on the side facing the electric motor 2 in order to allow a motor shaft of the electric motor 2 to be introduced into the gear housing 11, so a pinion mounted on the motor shaft meshes with a toothed wheel which is rotatably mounted in the gear housing 11.

Figure 2:
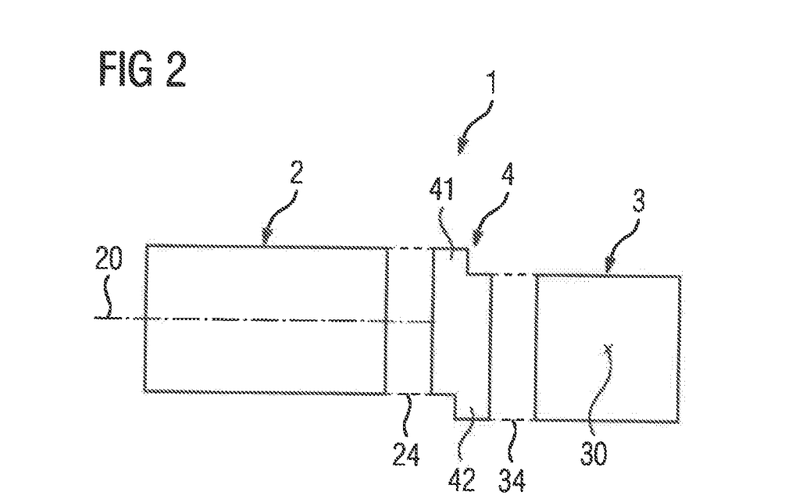
FIG. 2 shows the components of a hypoid geared motor.

FIG. 2 shows components of a hypoid geared motor 1, namely an electric motor 2 having a rotor shaft axle 20 running in the plane of the drawing, a hypoid gear 3 having a driven shaft axle 30 running perpendicular to the plane of the drawing, and an A-side motor end shield 4 arranged between the electric motor 2 and the hypoid gear 3, which has a motor-side section 41 and a gear-side section 42.

The relative assembly position of the electric motor 2 and of the A-side motor end shield 4 is indicated by the dashed lines 24; the relative assembly position of the hypoid gear 3 and of the A-side motor bearing plate 4 is indicated by the dashed lines 34.

Figure 3:
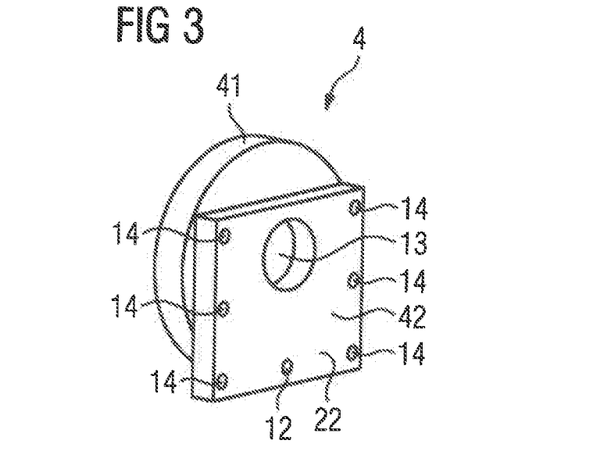
FIG. 3 shows an oblique view of a motor end shield.

FIG. 3 is an oblique view of the A-side motor end shield 4 of FIG. 1. The motor-side section 41 has fastening devices (not shown) for fastening to the stator housing 10, for example through holes for the passage of screw bolts, by means of which the A-side motor end shield 4 can be fastened to the stator housing 10. The gear-side section 42 has, along its two vertically running sides, continuous drilled holes 14 for inserting connecting bolts 8, which open out in the gear-side end face 22. The A-side motor end shield 4 can be screwed to the gear housing 11 with the aid of the continuous drilled holes 14.

The A-side motor end shield 4 has a through-opening 13 for passing through a motor shaft of the electric motor 2.

The gear-side section 42 has, at the lower edge of its gear-side end face 22, in the center of the bottom-side horizontal edge, a pin hole 12, in other words a through- or blind hole for inserting a pin. The function of the pin hole will be explained in more detail in FIG. 4.

Figure 4:
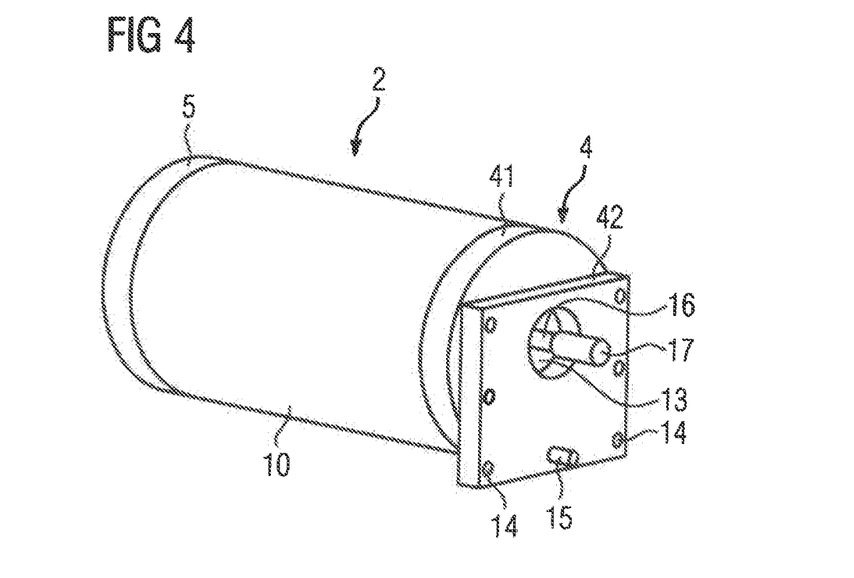
FIG. 4 shows an oblique view of an electric motor having a motor end shield according to FIG. 3.

FIG. 4 shows an oblique view of an electric motor 2 with an A-side motor end shield 4 according to FIG. 3. A motor shaft 16, to the end of which a pinion 17 is fastened, protrudes through the through-opening 13 of the A-side motor bearing plate 4. A pin 15 is inserted into the phi hole 12 at the lower edge of the gear-side end face 22 of the gear-side section 42 of the A-side motor bearing plate 4. It serves as a pivot point for the gear housing 11 relative to the A-side motor end shield 4. For this purpose, the pin 15 is inserted into a pin hole on the open end face of the gear housing 11 facing the electric motor 2.

Figure 5:
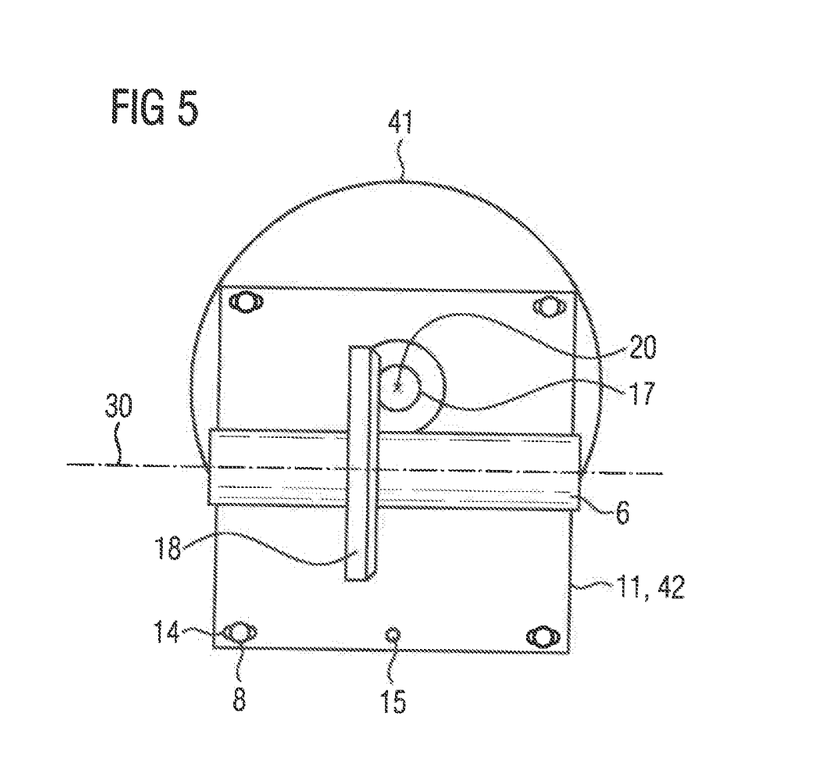
FIG. 5 shows a partially transparent view of the geared motor along the motor shaft.

FIG. 5 shows a schematic view along the axle 20 of the motor shaft, onto the A-side motor end shield 4 arranged downstream (in the viewing direction) of the gear housing 11, having the motor-side section 41 and the gear-side section 42 which is congruent with the gear housing 11. In this case, the gear housing 11 can be rotated about the pin 15, which is inserted both in a pin hole in the gear-side section 42 of the A-side motor end shield 4 and in a pin hole of the gear housing 11, as a pivot point with respect to the gear-side section 42 of the A-side motor end shield 4. The relative rotation is set in such a way that the pinion 17 meshes with a defined amount of play with the toothed wheel 18 of the hypoid gear, which is rotatably mounted about the shaft axle 30, a crown gear. In the defined relative position, the connecting bolts 8, which are guided through continuous drilled holes 14, which allow a rotation, of the gear housing 11 formed as elongated holes, are tightened, and therefore the desired position between the gear housing 11 and the A-side motor end shield 4 is secured.

Figure 6:
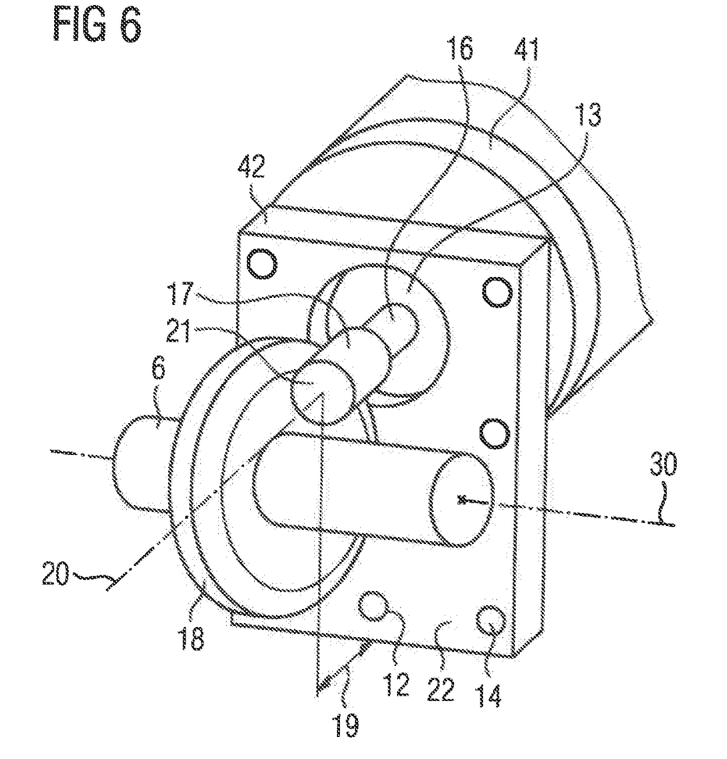
FIG. 6 shows an oblique view of a pinion meshing with a crown gear.

FIG. 6 shows an oblique view of a pinion 17 which meshes with a crown gear 18. The motor shaft 16, which protrudes through a through-opening 13 in the A-side motor end shield 41, 42, carries a pinion 17 at its tip, which meshes with a crown gear 18 which is mounted so as to be rotatable about the driven shaft 6 perpendicularly to the motor shaft 16. For defined axial positioning of the pinion 17 on the motor shaft 16, the end face 22 of the gear-side section 42 of the A-side motor end shield 41, 42 is selected as a reference plane. In this case, the pinion 17 is pressed into the motor shaft 16 until a defined distance 19 between the pinion 17, for example the end face 21 of the pinion 17, and the A-side motor end shield 41, 42, for example the end face 22 of the gear-side section 42 of the A-side motor end shield 41, 42 is achieved.

Figure 7:
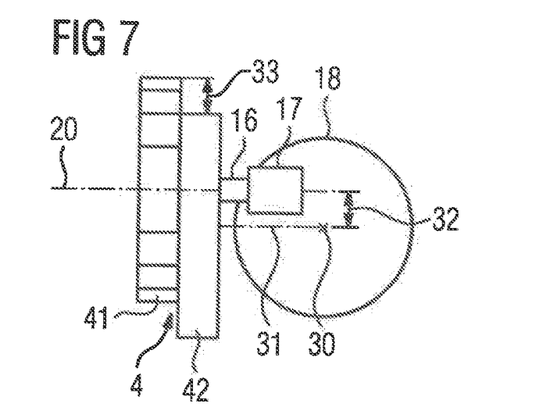
FIGS. 7 to 9 show a type series having three different motor end shields.
Figure 8:
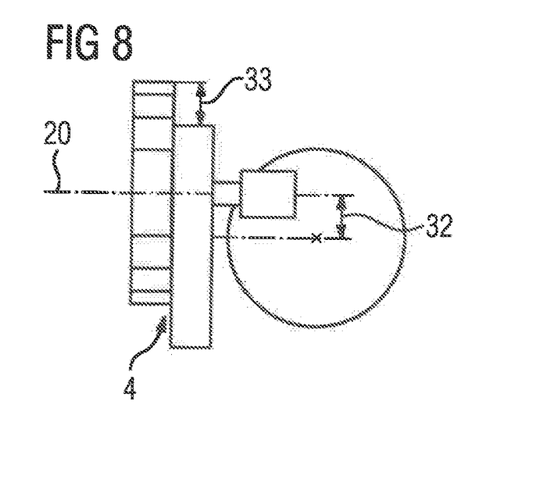
Figure 9:
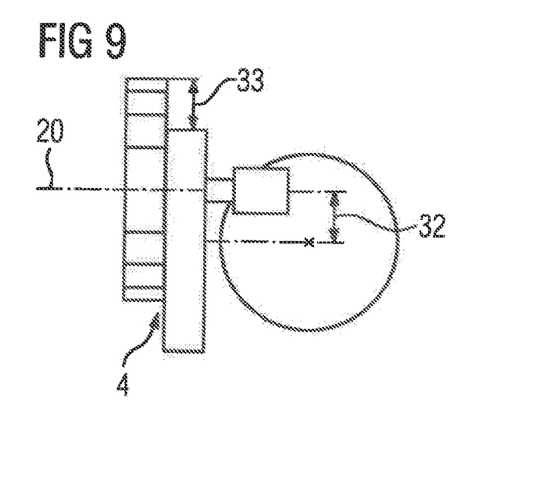

FIGS. 7 to 9 show three different A-side motor end shields 4, which form a type series. The A-side motor end shields 4 differ in that the height offset 33 between the motor-side section 41 and the gear-side section 42 of FIGS. 7 to 9 increases. On the one hand, the bearing of the motor shaft 16 and therefore the positions of the motor shaft axle 20 and of the pinion 17 remain unchanged with respect to the motor-side section 41. On the other hand, the positions of the driven shaft axle 30 and of the toothed wheel 18 remain unchanged with respect to the gear-side section 42. Consequently, the above-mentioned variation in the height offset 33 between the motor-side section 41 and the gear-side section 42 leads to a corresponding variation of the position of the pinion 17 with respect to the toothed wheel 18, in other words to a corresponding variation of the axial offset 32.

Figure 10:
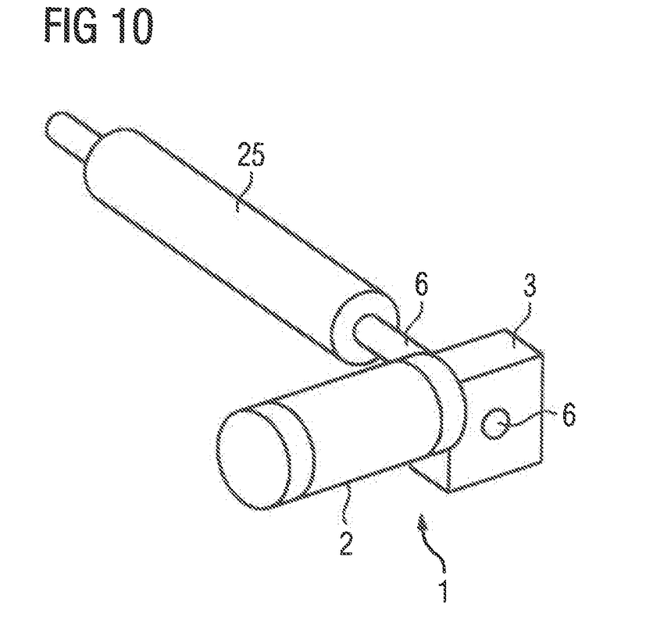
FIG. 10 shows a hypoid geared motor as a drive for a working machine.

FIG. 10 shows an angle geared motor 1, having an electric motor 2 and an angle gear 3 connected thereto. The rapid rotation of a motor shaft of the electric motor 2 is converted by the angle gear 3 into a slower rotation of a driven shaft 6 of the angle gear 3, rotated by 90 degrees. The driven shaft 6 of the angle gear 3 is connected in a rotationally fixed manner to a drive roller 25 of a roller track, for transporting piece goods such as packages, suitcases, pallets or crates.

Figure 11:
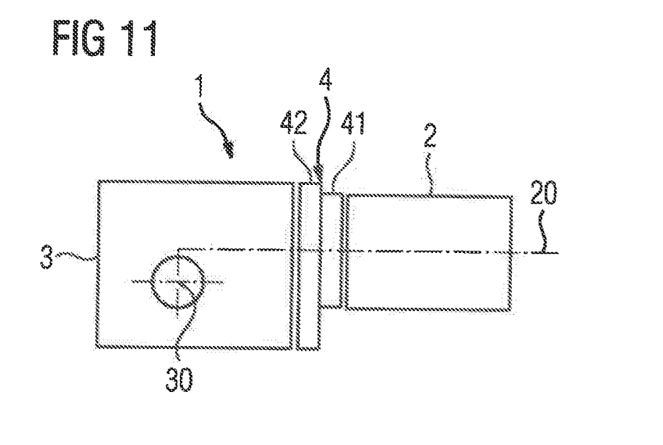
FIG. 11 shows a side view of a hypoid geared motor having a first, larger axial offset.

FIG. 11 shows a side view of a hypoid geared motor 1, comprising an electric motor 2 and an angle gear 3 connected to the electric motor 2, having a first, larger axial offset between a shaft axle 2 of the electric motor 2 and a shaft axle 30 of the angle gear 3. In this case, the gear-side motor end shield 4 of the electric motor 2, comprising a circular motor-side section 41 and a rectangular gear-side section 42, which according to its function is also referred to as a gear mounting plate, is arranged in a first assembly orientation.

Figure 13:
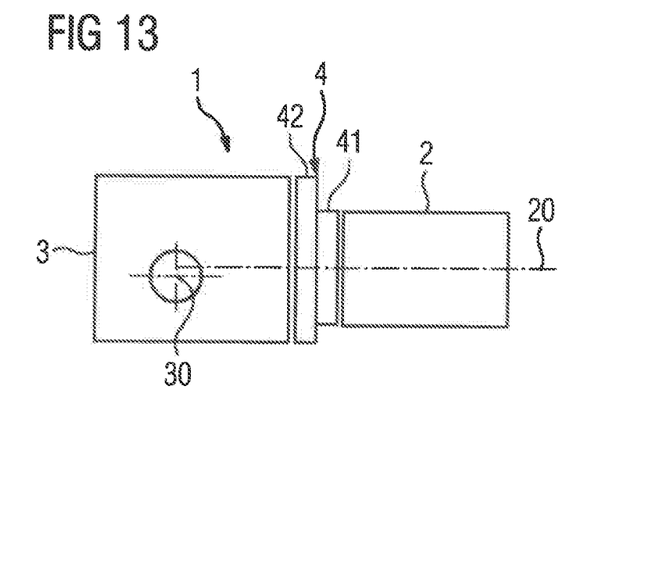
FIG. 13 shows a side view of a hypoid geared motor having a second, smaller axial offset.

FIG. 13 shows a side view of a second hypoid geared motor 1, which differs from the hypoid geared motor 1 of FIG. 11 only insofar as the gear-side motor end shield 4 is arranged in a second assembly orientation. In this case, the second assembly orientation results from the first assembly orientation by a rotation of the gear-side motor end shield 4 in the end shield plane by 180 degrees.

Figure 12:
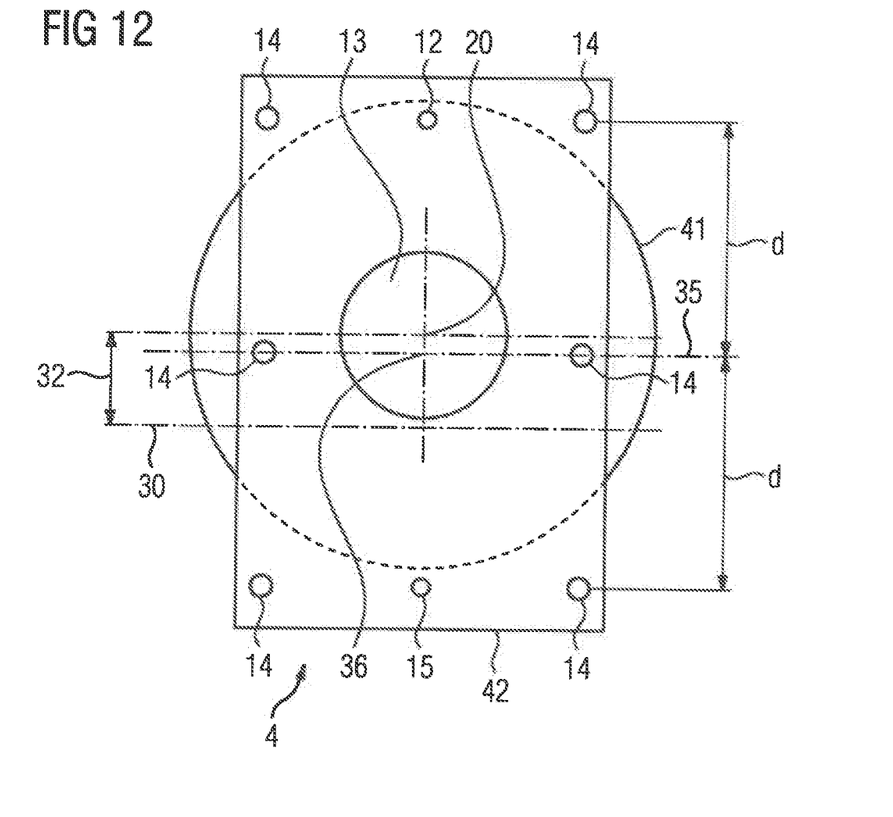
FIG. 12 shows a plan view of the gear mounting plate according to FIG. 11.

FIG. 12, which shows a plan view of the gear mounting plate 4 according to FIG. 11, represents the first assembly orientation of the gear-side motor end shield 4. In the plan view, the circular motor-side section 41 of the gear-side motor end shield 4 can also be seen partially concealed by the gear mounting plate 4.

The gear mounting plate 42 of the gear-side motor end shield 4 has six continuous drilled holes 14 along its circumference, with the hole pattern of the continuous drilled holes 14 being symmetrical with respect to a line of symmetry 35. In each case, three drilled holes 14 are arranged at a distance d from one another equidistantly along a longitudinal side. Centrally arranged on the narrow sides of the gear mounting plate 42 between two drilled holes 14 is in each case a pin hole 12. A pin 15 is inserted into the lower pin hole 12.

The through-opening 13 of the gear-side motor end shield 4, whose center point lies on the shaft axle 20 of the electric motor 2, is offset with respect to the shaft axle 30 of the gear 3 by a first, larger axial distance 32. In this case, the line of symmetry 35 of the hole pattern runs between the shaft axle 20 of the electric motor 2 and the shaft axle 30 of the gear 3.

Figure 14:
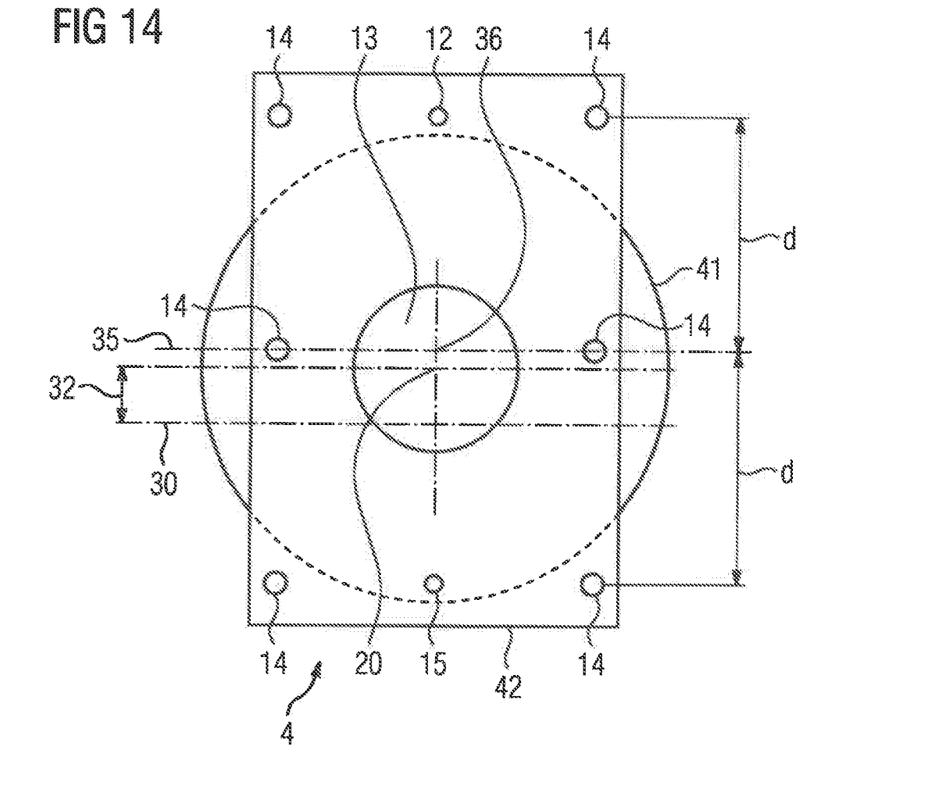
FIG. 14 shows a plan view of the gear mounting plate according to FIG. 13.

FIG. 14, which shows a plan view of the gear mounting plate 4 according to FIG. 13, represents the second assembly orientation of the gear-side motor end shield 4, which results from the first assembly orientation shown in FIG. 12 by a rotation of the gear-side motor end shield 4 in the end shield plane or about the shaft axle 20 of the motor 2 by 180 degrees.

The second assembly orientation illustrated in FIG. 14 differs from the first assembly orientation illustrated in FIG. 12 in that the through-opening 13 of the gear-side motor end shield 4, whose center point lies on the shaft axle 20 of the electric motor 2, is offset by a second, smaller axial distance 32 with respect to the shaft axle 30 of the gear 3 and the shaft axle 20 of the electric motor 2 between the line of symmetry 35 of the hole pattern and the shaft axle 30 of the gear 3.

What is claimed is:

1. An angle geared motor, comprising:
   a gear housing;
   a toothed wheel rotatably mounted in the gear housing;
   a gear-side motor end shield configured for passage of a motor shaft;
   an interface arranged between the gear housing and the gear-side motor end shield; and
   a pin fastened in the gear-side motor end shield and providing a pivot point for a rotation of the gear housing relative to the gear-side motor end shield.

2. The angle geared motor of claim 1, wherein the toothed wheel meshes with a pinion fastened to the motor shaft.

3. A method for setting a defined play between a pinion and a toothed wheel, in particular a crown near, of an angle geared motor according to claim 1, said method comprising:
   rotating a gear housing of the angle geared motor until the pinion rests without play on the toothed wheel to thereby define a zero position; and
   rotating the gear housing from the zero position about a predefined angle about a pivot point formed by a pin that is fastened in a gear-side motor end shield of the angle geared motor, with an angular rotation of the gear housing corresponding to the defined play.

4. The method of claim 3, wherein the gear housing is rotated about a specified angle by rotating the gear housing up to a corresponding, predefined marking on an outer side of the gear-side motor end shield.

* * * * *